(12) United States Patent
Nakanishi

(10) Patent No.: US 9,470,599 B1
(45) Date of Patent: Oct. 18, 2016

(54) LOAD DETECTION DEVICE

(71) Applicant: AISIN SEIKI KABUSHIKI KAISHA, Kariya-shi (JP)

(72) Inventor: Ryota Nakanishi, Obu (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 15/141,045

(22) Filed: Apr. 28, 2016

(30) Foreign Application Priority Data

May 20, 2015 (JP) .................................. 2015-103046

(51) Int. Cl.
*B60R 21/30* (2006.01)
*G01L 25/00* (2006.01)

(52) U.S. Cl.
CPC .................................... *G01L 25/00* (2013.01)

(58) Field of Classification Search
CPC ....... G01L 25/00; G01L 5/00; G01L 5/0009; G01L 5/0019; G01L 5/0052; G01L 5/0066; G01L 5/0061
USPC ..................................................... 701/45–47
See application file for complete search history.

(56) References Cited

U.S. PATENT DOCUMENTS

| 8,493,197 B2 | 7/2013 | Nakanishi et al. | |
| 2002/0198645 A1* | 12/2002 | Ishida | B60N 2/002 701/45 |
| 2003/0151240 A1* | 8/2003 | Saitou | B60R 21/0154 280/735 |
| 2005/0071062 A1* | 3/2005 | Takao | B60R 21/01516 701/45 |
| 2016/0221475 A1* | 8/2016 | Sugiyama | B60N 2/0244 701/49 |

FOREIGN PATENT DOCUMENTS

| JP | 2005-1611 | 1/2005 |
| JP | 2012-32312 | 2/2012 |
| JP | 2012-101593 | 5/2012 |
| JP | 2012-111264 | 6/2012 |

* cited by examiner

*Primary Examiner* — Richard Camby
(74) *Attorney, Agent, or Firm* — Oblon, McClelland, Maier & Neustadt, L.L.P.

(57) ABSTRACT

A load detection device includes: a load sensor; and a control device connected to the load sensor so as to perform bidirectional communication, wherein the load sensor includes a first controller acquiring load information based on a load detection signal and acquiring failure information based on relation between the load detection signal and a threshold signal, and a load information storage unit storing the load information as load information in failure detection as the failure information is switched to a state where a failure exists, the control device includes a second controller receiving the load information and the failure information in every predetermined communication period, and the second controller includes a waveform reproduction unit sequentially receiving the load information in failure detection and reproducing the load information in failure detection, and a failure determination unit determining presence of a failure based on the reproduced load information in failure detection.

4 Claims, 10 Drawing Sheets

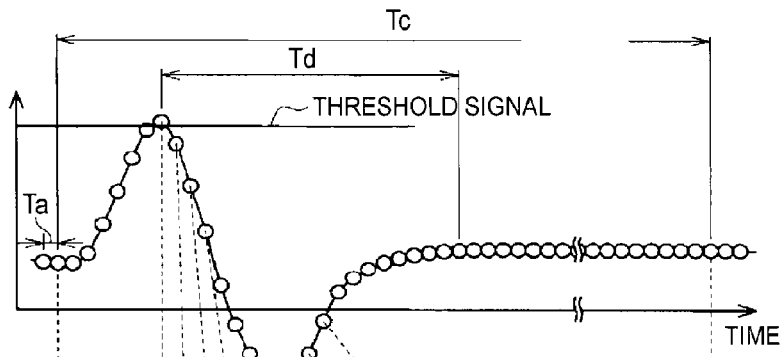
FIG.4A
LOAD DETECTION VOLTAGE V2
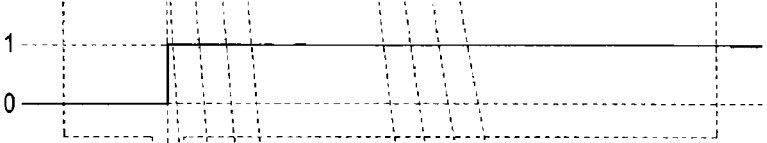
FIG.4B
ADDITIONAL BUFFER
FIG.4C
FAILURE DETECTION BIT
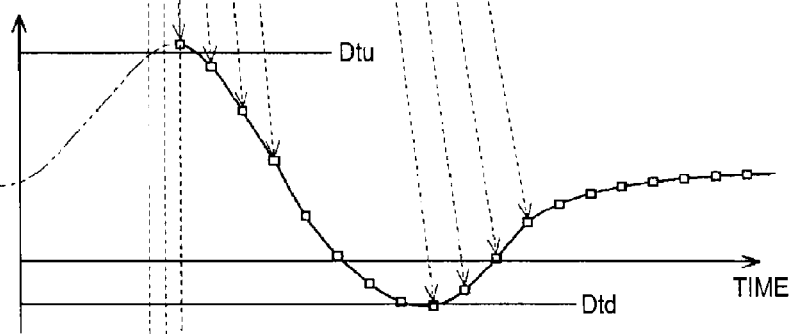
FIG.4D
REPRODUCED WAVEFORM DATA Di
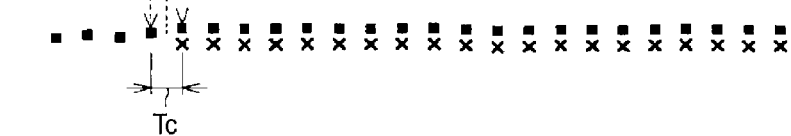
FIG.4E
LOAD INFORMATION

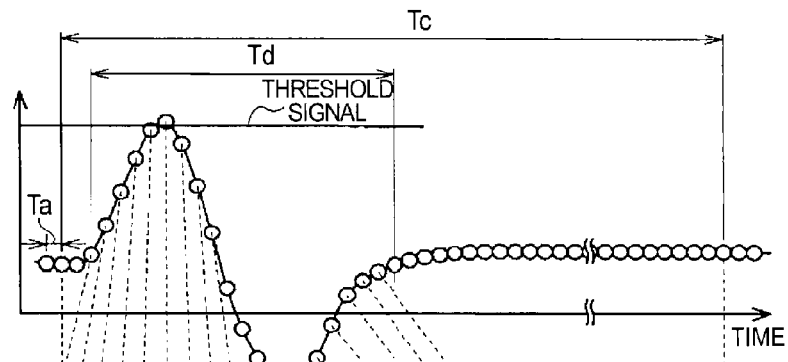
FIG.8A LOAD DETECTION VOLTAGE V2
FIG.8B ADDITIONAL BUFFER
FIG.8C FAILURE DETECTION BIT
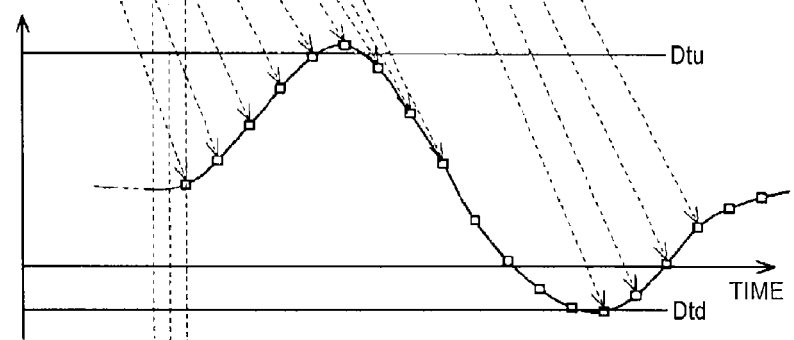
FIG.8D REPRODUCED WAVEFORM DATA Di
FIG.8E LOAD INFORMATION

LOAD DETECTION DEVICE

CROSS REFERENCE TO RELATED APPLICATIONS

This application is based on and claims priority under 35 U.S.C. §119 to Japanese Patent Application 2015-103046, filed on May 20, 2015, the entire contents of which are incorporated herein by reference.

TECHNICAL FIELD

This disclosure relates to a load detection device.

BACKGROUND DISCUSSION

As a load detection device, for example, one described in JP 2012-32312A (Reference 1) is known from the past. The load detection device includes a load sensor and a control device (ECU) connected to the load sensor so as to perform bidirectional communication. Then, the load sensor includes a load detection element outputting a load detection signal corresponding to a load to be applied to a seat body and a first controller (controller) which acquires load information based on the load detection signal. The first controller is configured to acquire failure information together based on magnitude relation between the load detection signal and a threshold signal corresponding to a threshold for detecting a failure. This is because there is a high possibility that a phenomenon (failure) requiring repair such as vehicle collision occurs, for example, when the load detection signal is excessive.

On the other hand, the control device includes a second controller (CPU) receiving load information and failure information from the load sensor. The second controller determines presence of an occupant, that is, whether the seat is vacant or occupied based on the load information. The second controller also drives an indicator to make notification to promote, for example, repair based on failure information.

Incidentally, in Reference 1, the second controller just receives failure information depending on the first controller and performs necessary processing in accordance with the failure information. This is because a communication period of the second controller which receives load information and so on is set to be significantly longer than an arithmetic period of the first controller which acquires load information and it is difficult to shorten the communication period of the second controller so as to obtain failure information by itself.

On the other hand, the first controller acquires failure information only based on the magnitude relation between the load detection signal and the threshold signal, therefore, the reliability thereof is naturally limited. Accordingly, for example, there is a possibility that the notification to promote repair is made by the second controller uselessly, though the repair is not necessary.

SUMMARY

Thus, a need exists for a load detection device which is not suspectable to the drawback mentioned above.

A load detection device according to an aspect of this disclosure includes a load sensor, and a control device connected to the load sensor so as to perform bidirectional communication, in which the load sensor includes a first controller acquiring load information in every predetermined arithmetic period based on a load detection signal corresponding to a load applied to a seat as well as acquiring failure information based on magnitude relation between the load detection signal and a threshold signal corresponding to a threshold for detecting a failure, and a load information storage unit storing the load information in every arithmetic period in a predetermined time as load information in failure detection as the failure information is switched to a state where a failure exists, the control device includes a second controller receiving the load information and the failure information in every predetermined communication period which is longer than the arithmetic period, and the second controller includes a waveform reproduction unit sequentially receiving the load information in failure detection in every arithmetic period in the predetermined time stored in the load information storage unit in every communication period when the failure information indicates the state where a failure exists and reproducing the load information in failure detection, and a failure determination unit determining presence of a failure based on the reproduced load information in failure detection.

BRIEF DESCRIPTION OF THE DRAWINGS

The foregoing and additional features and characteristics of this disclosure will become more apparent from the following detailed description considered with the reference to the accompanying drawings, wherein:

FIG. 4A to 4E are time charts showing a load detection voltage, storage areas of a buffer, a failure detection bit, reproduced waveform data and temporal transition of load information received by the ECU respectively;

FIG. 8A to 8E are time charts showing a load detection voltage, storage areas of a buffer, a failure detection bit, reproduced waveform data and temporal transition of load information received by the ECU respectively concerning a load detection device according to a second embodiment;

DETAILED DESCRIPTION

Hereinafter, an embodiment of a load detection device will be explained.

Figure 1:
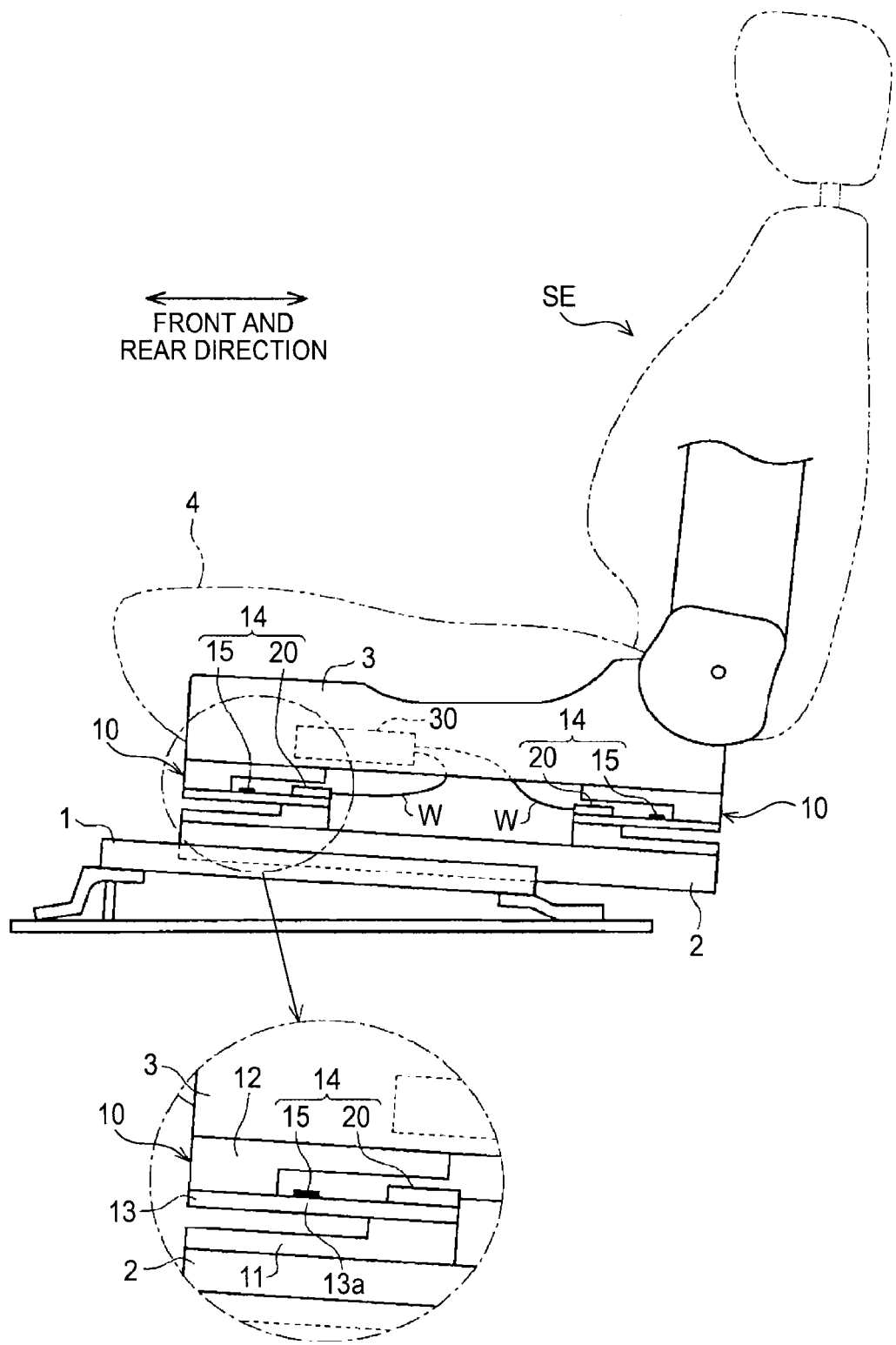
FIG. 1 is a side view showing a structure of a skeleton section of a seat to which a first embodiment of a load detection device is applied.

As shown in FIG. 1, on an upper surface of a vehicle floor, a pair of lower rails 1 arranged side by side in a width direction (direction orthogonal to the paper in FIG. 1) of a seat and extending in a front and rear direction are fixed and upper rails 2 are attached to respective both lower rails 1 so as to move in the front and rear direction.

On respective upper surfaces of both upper rails 2, lower arms 3 are fixed and supported at a given interval through front and rear pairs of sensor bodies 10. The lower arms 3 form a skeleton of a seat cushion 4 forming a seat surface of a seat SE. Four sensor bodies 10 in total are arranged including ones on the opposite side, which make pairs in front and rear of respective upper rails 2.

Each sensor body 10 includes a first bracket 11, a second bracket 12, a strain body 13 and a load sensor 14. The load sensor 14 includes a strain gauge 15 and a signal processing device 20. The first bracket 11 is fixed on an upper surface at a tip portion of the upper rail 2 and the second bracket 12 is fixed to a lower surface at a tip portion of the lower arm 3. The strain body 13 is formed in a plate shape, one end portion and the other end portion of which are fixed to an upper surface of the first bracket 11 and a lower surface of the second bracket 12 respectively. The strain body 13 forms a deflected portion 13a at a middle part thereof.

The stain gauge 15 of the load sensor 14 is adhered to an upper surface of the deflected portion 13a, and the signal processing device 20 is mounted on an upper surface of one end portion of the strain body 13 supported by the first bracket 11. The strain body 13 is deformed to bend with one end portion supported by the first bracket 11 as a supporting point when a load in an upper and lower direction is applied from the second bracket 12. The strain gauge 15 generates a gauge voltage in accordance with a strain amount caused by bending deformation of the strain body 13 (deflected portion 13a). The gauge voltage linearly varies in accordance with the load applied to the seat SE basically. The signal processing device 20 acquires load information and failure information based on the gauge voltage.

An ECU (Electronic Control Unit) 30 as a control device is supported by the lower arms 3, and the load sensors 14 (the signal processing devices 20) provided in all (four) sensor bodies 10 are connected to the ECU 30 so as to perform digital bidirectional communication through signal lines W. The ECU 30 receives load information acquired by these load sensors 14 and determines, for example, presence of an occupant, that is, whether the seat SE is vacant or occupied.

Next, an electrical configuration of the load sensor 14 and the ECU 30 will be explained.

Figure 2:
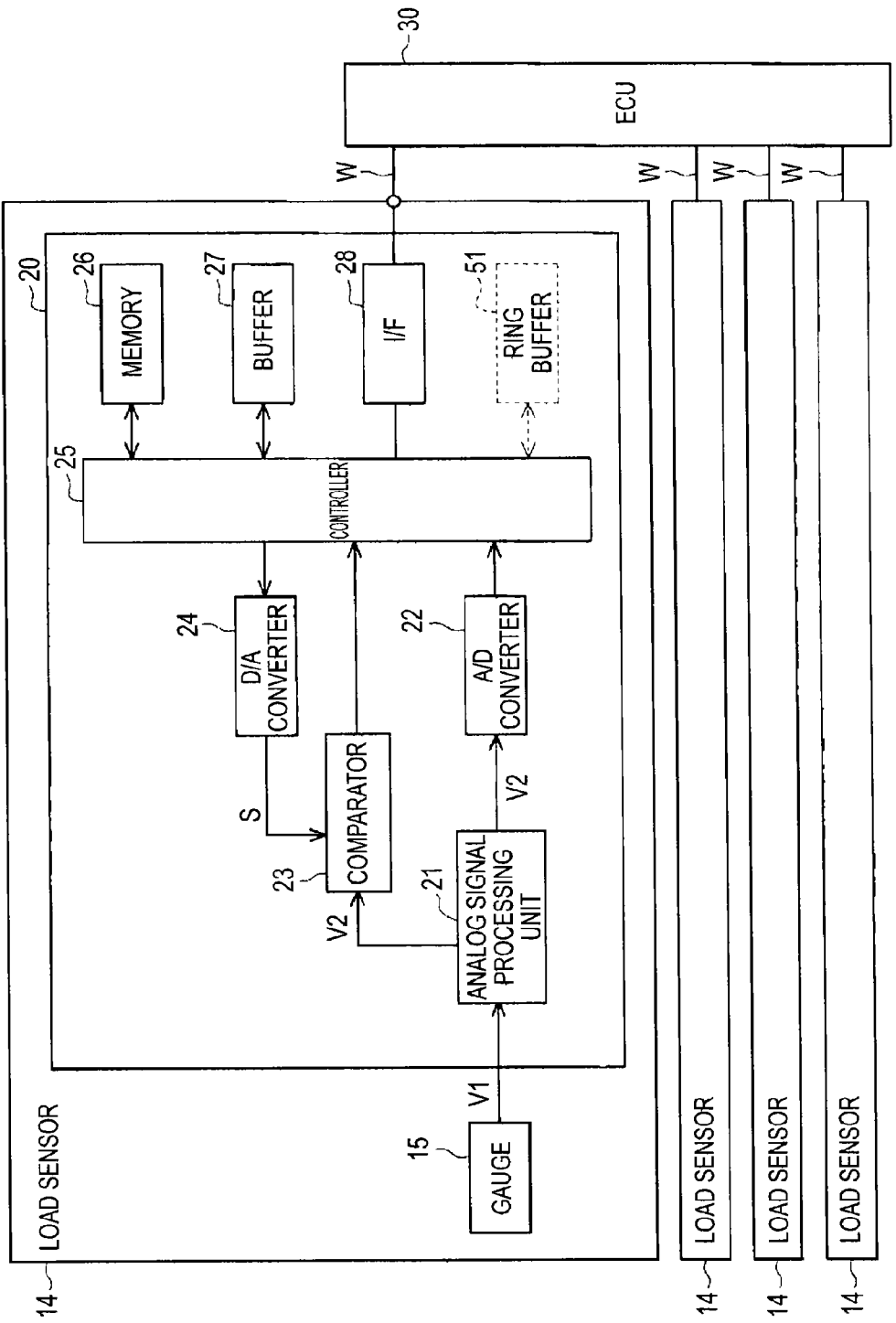
FIG. 2 is a block diagram showing an electrical configuration of a load sensor concerning the load detection device according to the embodiment.

As shown in FIG. 2, each signal processing device 20 of the load sensor 14 is provided with an analog signal processing unit 21, an A/D converter 22, a comparator 23, a D/A converter 24, a controller 25 as a first controller including a logic circuit, a rewritable nonvolatile memory 26 formed of, for example, an EEPROM (Electrically Erasable Programmable ROM), a buffer 27 as a load information storage unit formed of a RAM and a communication interface 28. The controller 25 is connected to the ECU 30 through the signal line W connected to the communication interface 28. The controller 25 transmits/receives respective signals with respect to the ECU 30 through the communication interface 28 and writes/reads various information (data) with respect to the memory 26 and the buffer 27 and performs other operations. The transmission/reception between the controller 25 and the ECU 30 (CUP 31) is repeated at a given communication period Tc (for example, 100 [ms]).

Here, the strain gauge 15 generates a gauge voltage V1 in accordance with a strain amount corresponding to the load applied to the seat SE, and outputs the voltage to the analog signal processing unit 21. The analog signal processing unit 21 amplifies the gauge voltage V1 to generate a load detection voltage V2 as a load detection signal and outputs the voltage to the A/D converter 22 and the comparator 23.

The A/D comparator 22 performs A/D conversion of the load detection voltage V2 so as to correspond to a given arithmetic period Ta (for example 10[μs]) of the controller 25 which is sufficiently shorter than the above communication period Tc to generate a load information signal. The controller 25 inputs the load information signal to thereby write and store the signals in the memory 26 as load information. Accordingly, load information is acquired in the load sensor 14 in every arithmetic period Ta. That is, the latest load information is updated and stored in the memory 26 in accordance with the arithmetic period Ta of the controller 25.

On the other hand, a threshold signal S from the D/A converter 24 is also outputted to the comparator 23. In detail, a threshold for detecting a failure is previously stored in the memory 26, and the controller 25 reads the threshold for detecting the failure to generate a failure detection threshold information signal and outputs the signal to the D/A converter 24. The D/A converter 24 performs D/A conversion of the failure detection threshold information signal to generate a threshold signal S and outputs the signal to the comparator 23.

The comparator 23 compares the magnitude between the load detection voltage V2 and the threshold signal S to output a signal in a level (high or low) corresponding to the comparison result to the controller 25. Specifically, the comparator 23 outputs a signal which becomes in a low level when the load detection voltage V2 is equal to or lower than the threshold signal S and becomes in a high level when the load detection voltage V2 is higher than the threshold signal S. This is because it has been confirmed that the load detection voltage V2 becomes excessive, for example, when a phenomenon requiring repair such as vehicle collision occurs as shown in FIG. 4A. A threshold for detecting the failure relating to generation of the threshold signal S is set to a value suitable for detecting a failure.

The controller 25 monitors an output signal of the comparator 23 in every arithmetic period Ta and detects a failure based on the level of the output signal, then, writes/stores a failure detection bit in the memory 26 as failure information. As shown in FIG. 4C, the failure detection bit maintains a state of "0" when the load detection voltage V2 is equal to or lower than the threshold signal S and the output signal of the comparator 23 maintains the state of the low level, and maintains a state of "1" after the load detection voltage V2 becomes higher than the threshold signal S and the output signal becomes in the high level. That is, the failure detection bit switches the logic before and after the failure is detected.

As shown in FIG. 4B, when the failure detection bit is switched from "0" to "1", the controller 25 stores all the load information acquired in every arithmetic period Ta in a predetermined time Td after that (for example, 200[μs]) in the buffer 27 as load information in failure detection. In FIG. 4B, storage areas of the buffer 27 in which load information in failure detection is stored in every arithmetic period Ta are represented by squares arranged in a line for convenience. The predetermined time Td is set based on a time which can almost contain transition of load information varying due to an impact at the time of, for example, vehicle collision. That is, all the load information in failure detection acquired in every arithmetic period Ta in the predetermined time Td are sequentially connected to thereby almost reproduce a waveform of load information (load detection voltage V2) at the time of detecting the failure. It goes without saying that the number N of load information in failure detection corresponds to a value obtained by dividing the predetermined time Td by the arithmetic period Ta (=Td/Ta, for example, 20).

The controller 25 also transmits load information and the failure detection bit to the ECU 30 through the communication interface 28 so as to correspond to transmission/reception timings of various signals between the controller 25 and the ECU 30 (in every communication period Tc). In particular, when all the load information in failure detection inside the predetermined time Td is stored in the buffer 27, the controller 25 sequentially transmits the load information in failure detection to the ECU 30 one by one so as to correspond to the transmission/reception timings of various signals between the controller 25 and the ECU 30 through the communication interface 28. That is, the ECU 30 receives load information in failure detection acquired in every arithmetic period Ta in the controller 25 after the failure detection bit is switched from "0" to "1" in every communication period Tc in a slow manner. The communication interface 28 is for forming various signals transmitted and received with respect to the ECU 30 into a given communication format.

Figure 3:
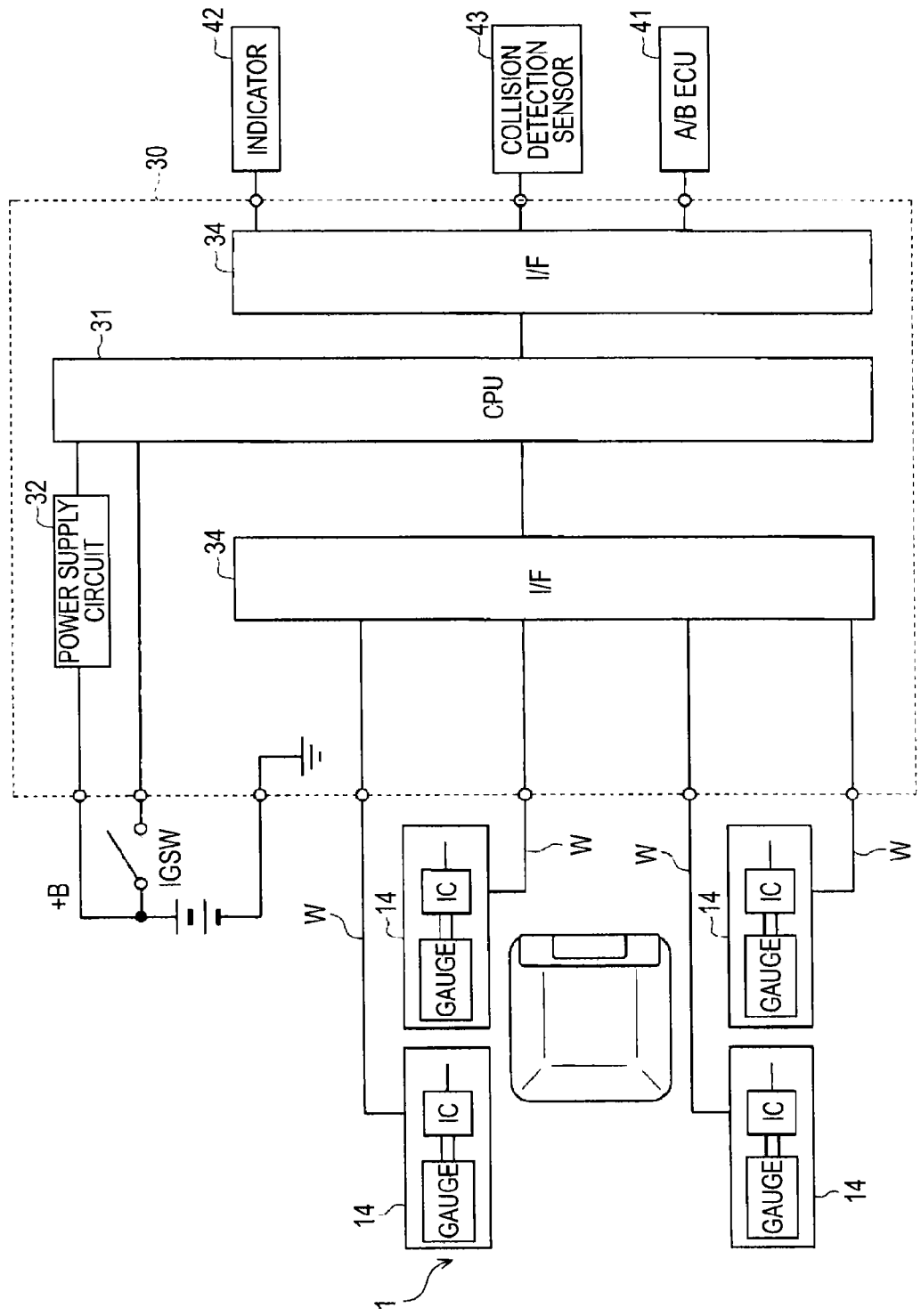
FIG. 3 is a block diagram showing an electrical configuration of an ECU concerning the load detection device according to the embodiment.

As shown in FIG. 3, the ECU 30 includes a CPU (Central Processing Unit) 31 as a second controller, a power supply circuit 32 and a communication interface 34. The CPU 31 is connected to all load sensors 14 (controllers 25) individually through the signal lines W connected to the communication interface 34. The CPU 31 also connected to an air bag ECU 41 of an air bag device through the communication interface 34 as well as connected to an indicator 42 installed at, for example, an instrument panel. The communication interface 34 is for forming various signals transmitted and received with respect to the load sensor 14 and so on into a given communication format. The CPU 31 includes a ROM storing various programs, maps and so on, and a RAM which can read and write various data and so on.

The CPU 31 receives the latest load information and the failure detection bit so as to correspond to the transmission and reception timings of various signals between the CPU 31 and respective load sensors 14 (in every communication period Tc) through the communication interface 34. Then, the CPU 31 calculates on-seat load information by adding load information from all the load sensors 14 and determines presence of the occupant based on the information (occupant determination unit).

Then, the CPU 31 outputs information indicating the determination result of the presence of the occupant to the air bag ECU 41 through the communication interface 34. The air bag ECU 41 controls actuation of the air bag based on the acquired information.

Moreover, when the failure detection bit received from any one of load sensor 14 is "1", the CPU 31 receives one load information in failure detection stored in the buffer 27 of the load sensor 14 through the communication interface 34 and stores the load information in failure detection as a reproduced waveform data Di (i=1 to N) (waveform reproduction unit). Specifically, the CPU 31 receives all the load information in failure detection stored in the buffer 27 in every communication period Tc (load information in failure detection in the predetermined time Td) one by one in the order from the oldest.

As shown in FIG. 4D, it is confirmed that a waveform connecting all the reproduced waveform data Di (i=1 to N) adjacent to one another almost reproduces a waveform of the load information (load detection voltage V2) obtained when the failure is detected (see FIG. 4A) though the waveform temporally extends as the communication period Tc is relatively long.

In FIG. 4E, the latest load information received by the CPU 31 in every communication period Tc through the communication interface 34 is represented by black square marks. The fact that the failure detection bit received by the CPU 31 in every communication period Tc through the communication interface 34 is "1", that is, the state of detecting the failure is represented by x-marks. As apparent from the drawing, it is confirmed that the CPU 31 receives the latest load information when the failure detection bit is "0", and the CPU 31 acquires the reproduced waveform data Di in addition to the latest load information when the failure detection bit turns to "1".

When the reception of all load information in failure detection stored in the buffer 27 is completed, the CPU 31 determines whether a failure detection condition is satisfied or not, for example, in accordance with at least one procedure of the following (1) to (4) based on the reproduced waveform data Di (i=1 to N) of all the load information in failure detection (failure determination unit). Then, the CPU 31 performs processing of detecting the failure in accordance with the determination result or performs processing of cancelling the failure detection. Specifically, the CPU 31 outputs a drive signal to the indicator 42 through the communication interface 34 to turn on the indicator 42 in the processing of detecting the failure, and stops outputting the drive signal to the indicator 42 in the processing of cancelling the failure detection.

(1) The CPU 31 determines (redetermines) whether the top reproduced waveform data Di (i=1) is higher than a given upper-limit threshold data Dtu corresponding to the threshold signal S (threshold for detecting the failure) or not. Then, the CPU 31 performs processing of detecting the failure when the reproduced waveform data Di (i=1) is higher than the upper-limit threshold data Dtu, and performs processing of cancelling the failure detection when the reproduced waveform data Di (i=1) is equal to or lower than the upper-limit threshold data Dtu.

(2) The CPU 31 determines whether the reproduced waveform data Di (i=I>1) after that is lower than a given lower-limit threshold data Dtd corresponding to a negative number or not. Then, the CPU 31 performs processing of detecting the failure when the reproduced waveform data Di is lower than the lower-limit threshold data Dtd, and performs processing of cancelling the failure detection when the reproduced waveform data Di is equal to or higher than the lower-limit threshold data Dtd. This is because the possibility that a phenomenon requiring repair such as vehicle collision occurs is high when the load detection voltage V2 is drastically reduced after being excessive.

(3) The CPU 31 determines whether a number "I" of the reproduced waveform data Di (i=I>1) is lower than a given number "L" when the data is lower than the lower-limit threshold data Dtd, that is, whether the reproduced waveform data Di is rapidly reduced or not. Then, the CPU 31 performs processing of detecting the failure when it is determined that the number I is lower than the given number "L" and the reproduced waveform data Di is rapidly reduced, and performs processing of cancelling the failure detection when it is determined that the number "I" is equal to or higher than the given number "L" and the reproduced waveform data Di is not rapidly reduced. This is because the possibility that the phenomenon requiring repair such as vehicle collision occurs is high when the load detection voltage V2 is rapidly reduced after being excessive.

(4) The CPU 31 determines whether a number "m" of the reproduced waveform data Di (i=m>1) further after that is lower than a given number "M" when the data is returned to a positive number and converges in a given range, that is, whether return/convergence is rapid after the reproduced waveform data Di is rapidly reduced or not. Then, the CPU 31 performs processing of detecting the failure when it is determined that the number "m" is lower than the given number "M" and return/convergence is rapid after the reproduced waveform data Di is rapidly reduced, and performs processing of cancelling the failure detection when it is determined that the number "m" is equal to or higher than the given number "M" and the return/convergence is not rapid after the reproduced waveform data Di is rapidly reduced. This is because the possibility that the phenomenon requiring repair such as vehicle collision occurs is high when the load detection voltage V2 is rapidly returned and converges after being increased/reduced rapidly.

That is, the CPU 31 performs higher-level failure determination based at least one procedure of (1) to (4) by utilizing arithmetic capacity.

Figure 5:
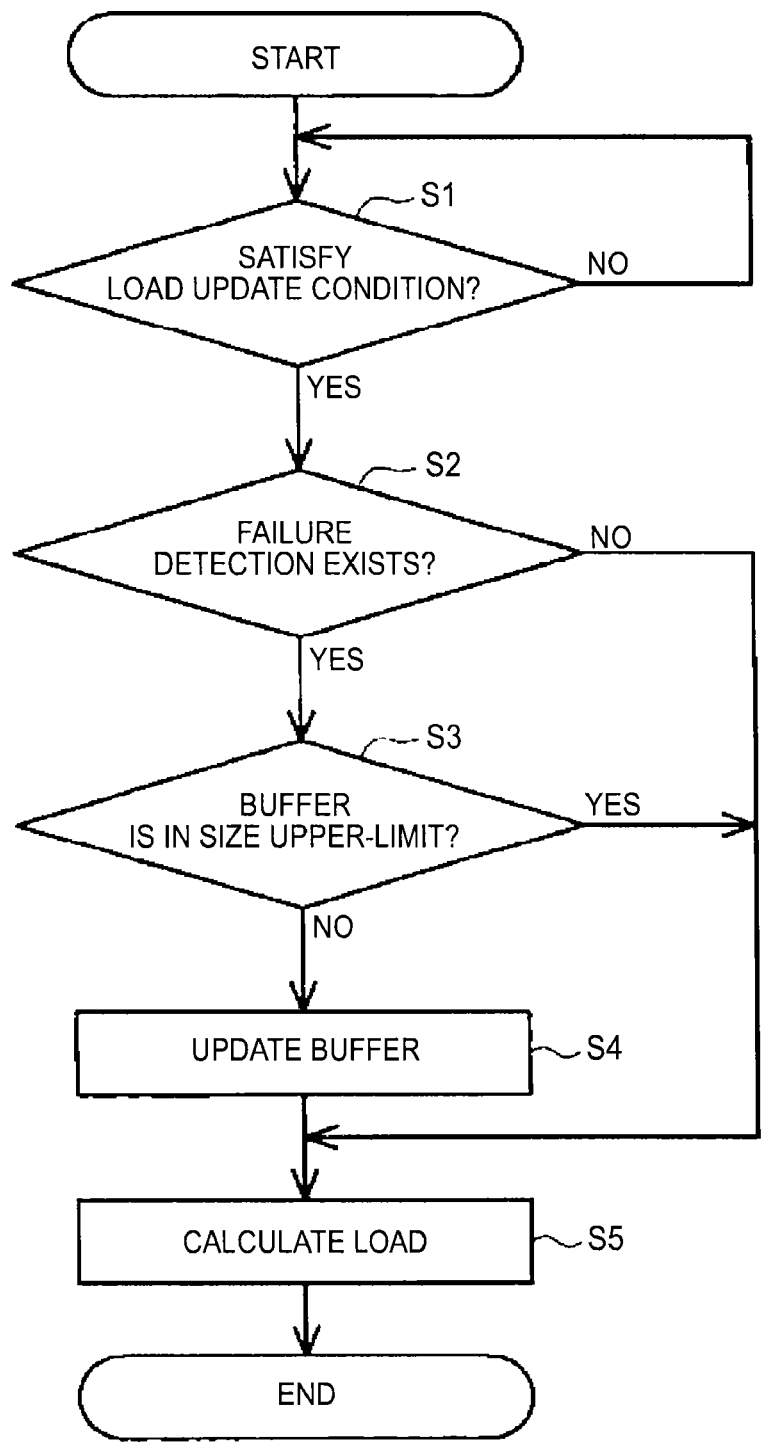
FIG. 5 is a flowchart showing a method of storing load information by the load sensor concerning the load detection device according to the embodiment.

Next, a method of storing load information in failure detection by the controller 25 of the load sensor 14 will be generally explained with reference to a flowchart shown in FIG. 5. The processing is repeatedly executed in every arithmetic period Ta.

When the process proceeds to this routine, the controller 25 determines whether a load update condition is satisfied or not based on whether sampling time in the A/D converter 22 has passed (whether A/D conversion of the load detection voltage V2 has been completed) or not in Step S1. Then, the controller 25 proceeds to Step S2 after waiting for the satisfaction of load update condition, where the presence of failure detection is determined based on the output signal of the comparator 23.

When it is determined that there is failure detection in Step S2, the controller 25 proceeds to Step S3 and determines whether the buffer 27 is in a size upper-limit state or not which means that N-pieces of load information in failure detection (all load information in failure detection in the predetermined time Td) is stored in the buffer 27. Then, when it is determined that the buffer 27 is not in the size upper-limit state, the controller 25 proceeds to Step S4, storing and updating load information at that time in the buffer 27 as load information in failure detection in the order of storage areas. Then, the controller 25 proceeds to Step S5. On the other hand, when it is determined that the buffer 27 is in the size upper-limit state, the controller 25 directly proceeds to Step S5 without updating the buffer 27 (stop updating the buffer 27). The controller 25 also directly proceeds to Step S5 also when it is determined that there is not failure detection in Step S2. That is, update of the buffer 27 is repeated in every arithmetic period Ta until N-pieces of load information in failure detection is stored in the buffer 27 the original storage areas of which are blank when there is failure detection by the processing in Step S2 to Step S4.

In Step S5, the controller 25 performs load calculation based on load information at that time. When load information acquired by the controller 25 does not indicate a numeral of the load itself though it correlates with the actual load, the load calculation and storing is performed so that the information corresponds to the numeral to thereby improve versatility of information. After that, the controller 25 ends the processing temporarily.

Figure 6:
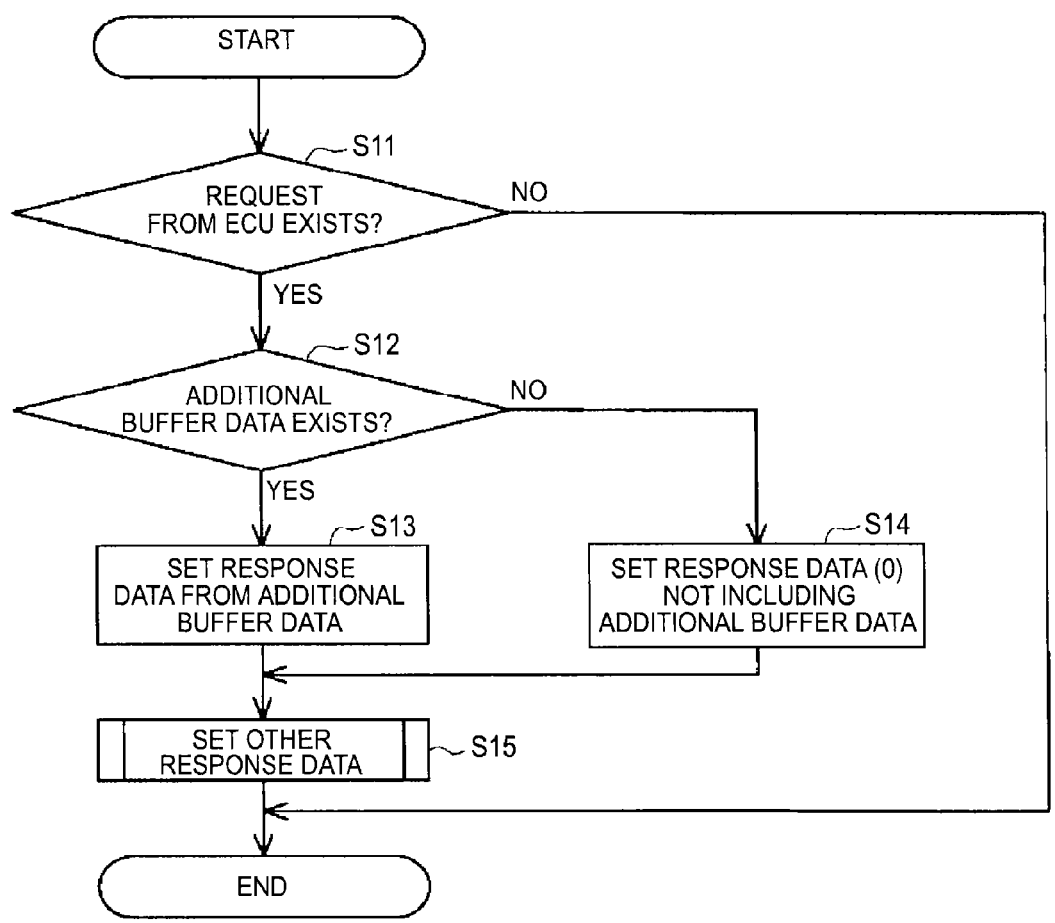
FIG. 6 is a flowchart showing a method of setting transmission information to the ECU by the load sensor concerning the load detection device according to the embodiment.

Next, a method of setting transmission information (response data) with respect to the ECU 30 by the controller 25 of the load sensor 14 will be generally explained with reference to a flowchart shown in FIG. 6. The processing is repeatedly executed in every arithmetic period Ta.

When the process proceeds to this routine, the controller 25 determines whether a request from the ECU 30 exists or not in Step S11. The existence of request is determined, for example, based on existence of a request signal transmitted from the ECU 30 in every communication period Tc. Then, when it is determined that the request from the ECU 30 does not exist, the controller 25 temporarily ends the process as it is, and when it is determined that the request exists, the controller 25 proceeds to Step S12 and determines whether additional buffer data to be transmitted to the ECU 30 exists or not. Specifically, the controller 25 determines whether the buffer 27 is in the size upper-limit state where N-pieces of load information in failure detection (all load information in failure detection in the predetermined time Td) is stored in the buffer 27 and whether there is load information in failure detection which has not been transmitted to the ECU 30 or not.

When it is determined that the additional buffer data exists in Step S12, the controller 25 proceeds to Step S13 and sets response data from the additional buffer data. Specifically, the controller 25 reads the oldest load information in failure detection in the load information in failure detection which has not been transmitted to the ECU 30, and sets the information as transmission information with respect to the ECU 30. On the other hand, it is determined that additional buffer data does not exist in Step S12, the controller 25 proceeds to Step S14 and sets response data (for example, "0") indicating that additional buffer data does not exist.

The controller 25 which has set the response data in accordance with the existence of additional buffer data in Step S13 or Step S14 proceeds to Step S15, setting other response data. Specifically, the controller 25 reads the latest load information and the failure detection bit from the memory 26 and sets the information as transmission information with respect to the ECU 30. After that, the controller 25 temporarily ends the process. The response data set in Step S13 or Step S14 is transmitted to the ECU 30 with other response data set in Step S15. Therefore, for example, when response data is set from the additional buffer data in Step S13, the oldest untransmitted load information in failure detection in the buffer 27 is transmitted to the ECU 30 with the latest load information and the failure detection bit.

Figure 7:
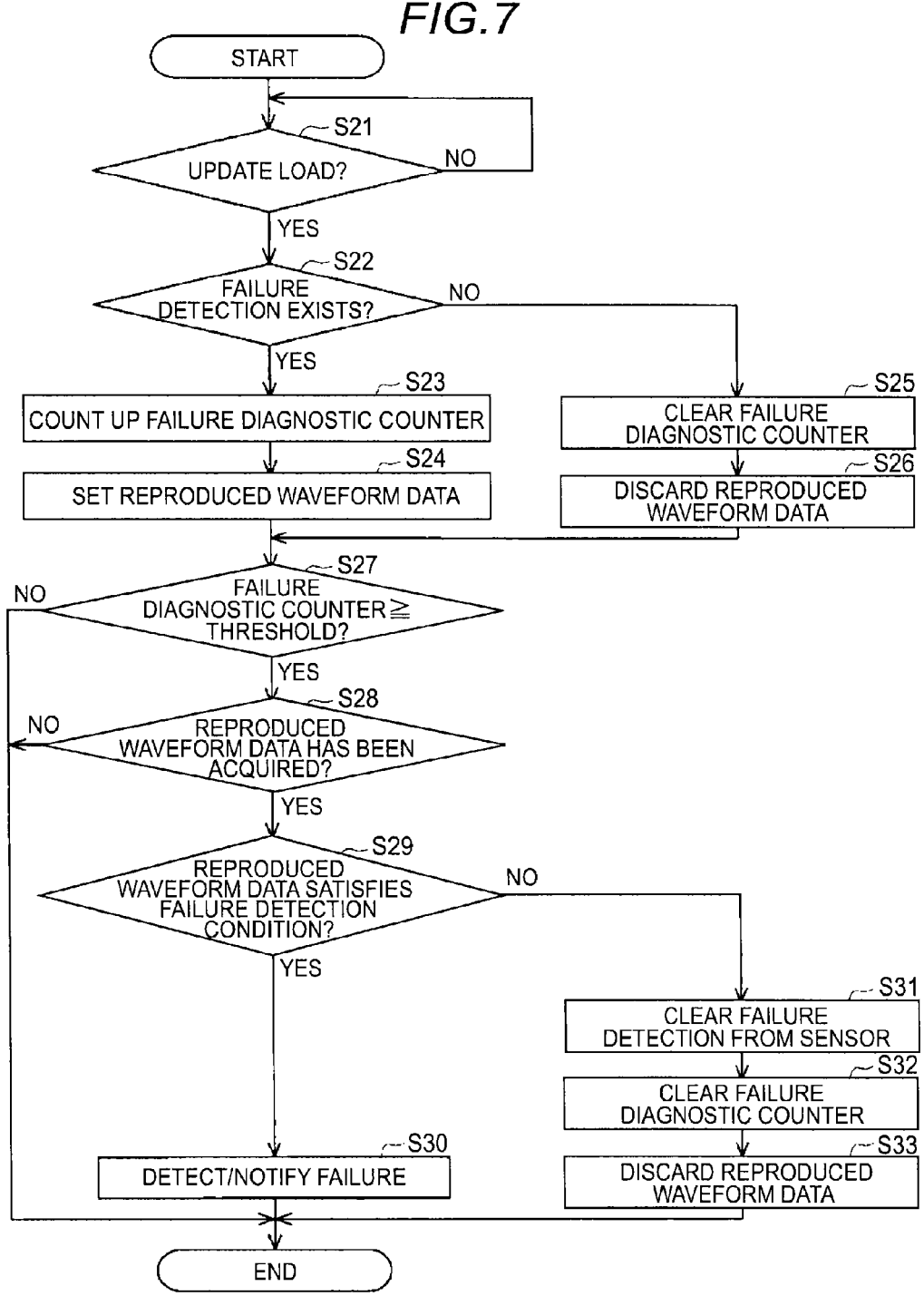
FIG. 7 is a flowchart showing a method of determining a failure by the ECU concerning the load detection device according to the embodiment.

Next, a method of determining the failure by the CPU 31 of the ECU 30 will be generally explained with reference to a flowchart shown in FIG. 7. The processing is repeatedly executed in every communication period Tc so as to correspond to the request with respect to the load sensor 14 (the controller 25).

When the process proceeds to this routine, the CPU 31 determines whether the load update has been completed or not in Step S21. Specifically, the CPU 31 determines whether the latest load information and so on (response data) transmitted from the controller 25 in accordance with the request has been arrived or not. Then, the CPU 31 waits for the completion of load update and proceeds to Step S22, determining existence of failure detection based on the logic ("0" or "1") of the failure detection bit.

When it is determined that a failure detection exists in Step S22, the CPU 31 proceeds to Step S23 and counts up (increments) a failure diagnostic counter CNT as well as proceeds to Step S24 and sets load information in failure detection read/transmitted by the buffer 27 at that time as a reproduced waveform data Di. On the other hand, when it is determined that there is no failure detection in step S22, the CPU 31 proceeds to Step S25 and clears the failure diagnostic counter CNT (set to "0") as well as proceeds to Step S26 and discards (resets) all reproduced waveform data Di which has been set until now. The failure diagnostic counter CNT indicates the number of communication where the failure detection bit becomes "1" continuously, namely, the time during which the failure detection bit keeps the state of "1".

The CPU 31 performs processing of Step S24 or Step S26 proceeds to Step S27 and determines whether the failure diagnostic counter CNT is equal to or higher than a given threshold, namely, whether the state where the failure detection bit is "1" is kept for a given period of time or not. Then, when it is determined that the failure diagnostic counter CNT is equal to or higher than the given threshold, the CPU 31 determines whether reproduced waveform data has been acquired or not, namely, whether all reproduced waveform data Di (i=1 to N) has been set or not. The determination in Step S27 is substantially equivalent to determination in Step S28 when the threshold is a value "N". In other words, when threshold is set to values other than the value "N" by the determination in Step S27, the time during which the failure detection bit keeps the state of "1" can be monitored separately from the determination in Step S28.

When it is determined that the reproduced waveform data has been acquired in Step S28, the CPU 31 proceeds to Step S29 and determines whether the reproduced waveform data Di (i=1 to N) satisfies the failure detection condition or not based on at least one procedure of the above (1) to (4). Then, it is determined that the reproduced waveform data Di (i=1 to N) satisfies the failure detection condition, the CPU 31 proceeds to Step S30 and performs processing of detecting/notifying the failure, then, temporarily ends the process. Specifically, the CPU 31 outputs a drive signal to the indicator 42 through the communication interface 34 and drives the indicator 42 to be turned on. Accordingly, the occupant such as a driver is promoted to take measures, for example, by bringing a vehicle to a maintenance factory such as a dealer.

On the other hand, when it is determined that the failure diagnostic counter CNT is lower than the given threshold in Step S27, the CPU 31 temporarily ends the process. This is because, when the failure detection bit becomes the state of "1" temporarily due to some reasons, the possibility of occurrence of failure is low. Similarly, when it is determined that the reproduced waveform data has not been acquired in Step S28, the CPU 31 temporarily ends the process.

When it is determined that the reproduced waveform data Di (i=1 to N) does not satisfy the failure detection condition in Step S29, the CPU 31 proceeds to Step S31 and sets a corresponding request signal so as to clear the failure detection bit stored in the memory 26 of the load sensor 14 (set to "0"). When the request signal is transmitted to the load sensor 14 (controller 25) through the communication interface 34 and so on at, for example, communication timing of next time, the controller 25 clears the failure detection bit stored in the memory 26 as well as clears all of the N-pieces load information in failure detection stored in the buffer 27.

Subsequently, the CPU 31 proceeds to Step S32 and clears the failure diagnostic counter CNT as well as proceeds to Step S33 and discards all reproduced waveform data Di (i=1 to N). Then, the CPU 31 temporarily ends the process.

As apparent from the above explanation, the indicator 42 does not turned on unless the failure detection condition is satisfied in Step S29 regardless of the logic of the failure detection bit.

As described above, the following operations and effects can be obtained according to the embodiment.

(1) In the embodiment, the CPU 31 receives/reproduces load information in failure detection in every arithmetic period Ta in the predetermined time Td and determines existence of a failure based on the reproduced load information in failure detection (reproduced waveform data Di). In this case, the CPU 31 can utilize transition of load information in failure detection such as lapsed time until load information in failure detection is switched from one of increase and reduction to the other of them, or lapsed time until these variations converge (procedures of (3) to (4)) based on at least one procedure of (2) to (4) in addition to the threshold determination (the procedure of (1)) in accordance with the threshold determination by the controller 25 in the determination of existence of the failure in Step S29. Accordingly, accuracy in determining the existence of a failure can be further improved. Then, it is possible to further improve the reliability in notification to promote repair performed by the CPU 31 when it is determined that a failure exists (YES in Step S29). On the other hand, the CPU 31 has to just receive load information in failure detection stored in the buffer 27 in every arithmetic period Ta in the predetermined time Td sequentially in every communication period Tc, therefore, it is not necessary to increase the communication load. That is, it is possible to improve the accuracy in determining the existence of the failure while using the simple and inexpensive CPU 31 which has small communication capacity (arithmetic capacity).

Second Embodiment

Hereinafter, a second embodiment of the load detection device will be explained. The second embodiment has a configuration in which the method of storing load information in failure detection by the controller 25 of the load sensor 14 according to the first embodiment is changed as a major point, therefore, detailed explanation for the same components will be omitted. In the embodiment, a ring buffer 51 is adopted instead of the buffer 27 as shown in FIG. 2. The ring buffer 51 constantly stores the latest N-pieces of load information acquired by the controller 25. The controller 25 writes (overwrites) load information newly acquired in every arithmetic period Ta in storage areas of the ring buffer 51 which stores the oldest load information in the N-pieces of information and sets the storage area of the ring buffer 51 which stores load information to be the oldest newly to the top storage area. That is, the ring buffer 51 stores N-pieces of load information in a state of being managed in the order from the oldest.

Accordingly, as shown in FIG. 8A, even when the load detection voltage V2 becomes higher than the threshold signal S and an output signal of the comparator 23 becomes in the high level, the latest N-pieces of load information is stored in the ring buffer 51.

The controller 25 monitors the output signal of the comparator 23 in every arithmetic period Ta as well as detects a failure based on the level of the output signal and writes/stores the failure in the memory 26 as the failure detection bit which is failure information, which is the same as the first embodiment. As shown in FIG. 8C, it goes without saying that the logic of the failure detection bit is switched before and after the detection of failure when the failure is detected.

Moreover, when the failure detection bit is switched from "0" to "1" as shown in FIG. 8B, the controller 25 sets the last storage area of the ring buffer 51 which allows new storage/update of load information. In FIG. 8B, storage areas of the ring buffer 51 in which load information is stored at the time of stopping update of the ring buffer 51 are represented by squares arranged in a line for convenience, and in particular, hatching is given to the last storage area in which update is stopped. As apparent from the drawing, the ring buffer 51 stores load information as load information in failure detection so as to include transition in which the load detection voltage V2 rapidly increases until the voltage becomes higher than the threshold signal S in the state where update of the ring buffer 51 is stopped. That is, a waveform of load information (load detection voltage V2) including a state before failure is detected can be almost reproduced by connecting all load information in failure detection acquired in every arithmetic period Ta in the predetermined time Td in order.

The controller 25 transmits load information and the failure detection bit to the ECU 30 (CPU 31) through the communication interface 28 so as to correspond to transmission/reception timings of various signals between the controller 25 and the ECU 30, which is the same as the first embodiment. In particular, the controller 25 transmits load information in failure detection of the ring buffer 51 one by one from the oldest order through the communication interface 28 so as to correspond to transmission/reception timings of various signals with respect to the ECU 30 in the state where update of the ring buffer 51 is stopped. That is, the ECU 30 receives N-pieces of load information in failure detection acquired in every arithmetic period Ta by the controller 25 by the timing when update of the ring buffer 51 is stopped (an end period of the predetermined time Td) slowly in every communication period Tc.

The ECU 30 (CPU 31) receives one load information in failure detection stored in the ring buffer 51 of the load sensor 14 through the communication interface 34 when the failure detection bit received from any one of load sensor 14 is "1", and stores the load information in failure detection as a reproduced waveform data Di (i=1 to N) (waveform reproduction unit).

As shown in FIG. 8D, it is confirmed that a waveform connecting all the reproduced waveform data Di (i=1 to N) adjacent to one another in order almost reproduces a waveform of the load information (load detection voltage V2) including the state before the failure is detected (see FIG. 8A) though the waveform temporally extends as the communication period Tc is relatively long.

In FIG. 8E, the latest load information received by the CPU 31 in every communication period Tc through the communication interface 34 is represented by black square marks. The fact that the failure detection bit received by the CPU 31 in every communication period Tc through the communication interface 34 is "1", that is, the state of detecting the failure is represented by x-marks. As apparent from the drawing, it is confirmed that the CPU 31 receives the latest load information when the failure detection bit is "0", and the CPU 31 acquires the reproduced waveform data Di in addition to the reception of the latest load information when the failure detection bit turns to "1".

Figure 9:
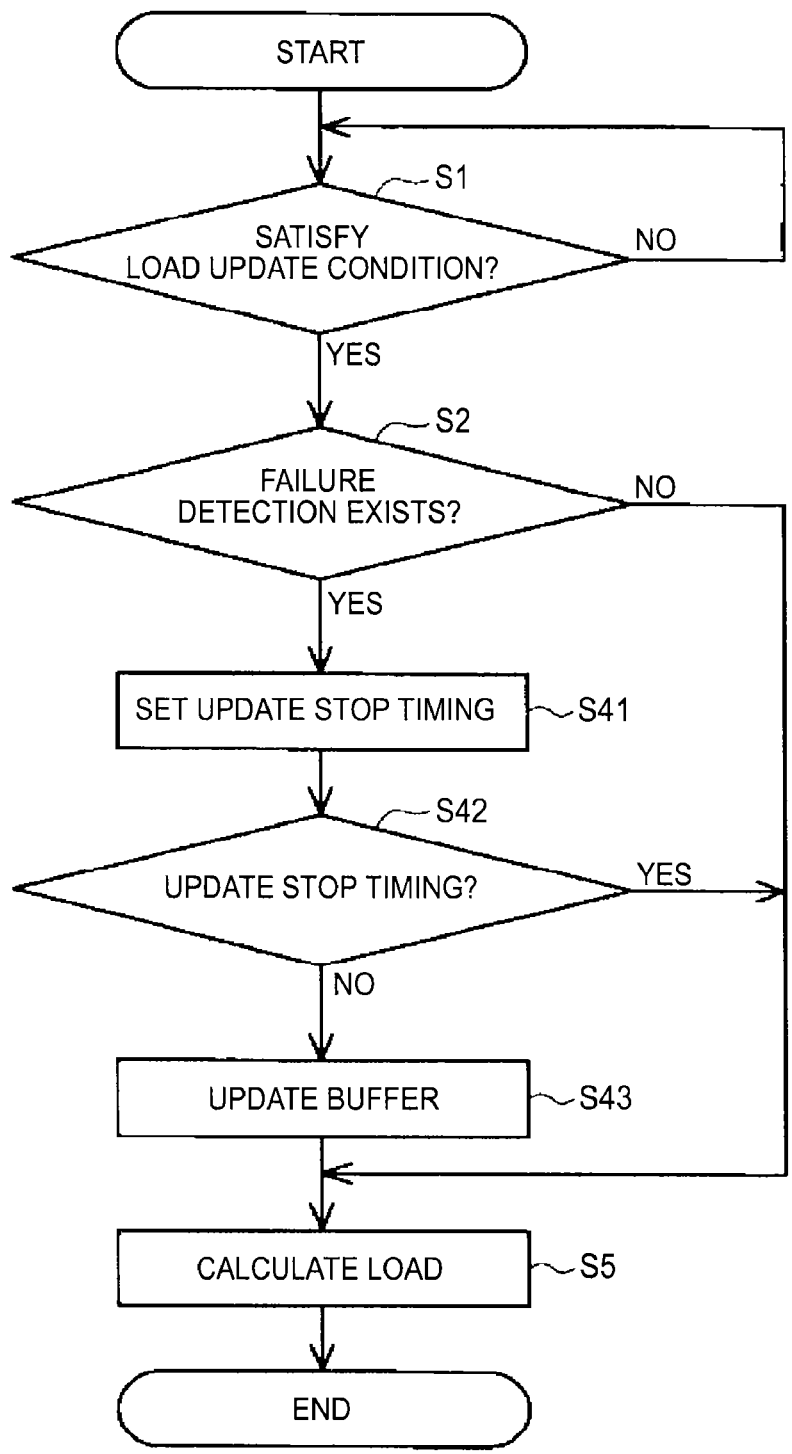
FIG. 9 is a flowchart showing a method of storing load information by the load sensor concerning the load detection device according to the embodiment.

Next, a method of storing load information in failure detection by the controller 25 of the load sensor 14 will be generally explained with reference to a flowchart shown in FIG. 9. The processing is repeatedly executed in every arithmetic period Ta.

When the process proceeds to this routine, the controller 25 performs processing of the above described Step S1 and S2. When it is determined that a failure detection exists in Step S2, the controller 25 proceeds to Step S41 and sets the update stop timing of the ring buffer 51, namely, sets the final storage area of the ring buffer 51 which allows storage/update of new load information (load information in failure detection). The setting of update stop timing is performed when the failure detection bit is switched from "0" to "1", and the original setting is kept while the failure detection bit keeps the state of "1".

Next, the controller 25 proceeds to Step S42 and determines whether the process reaches the update stop timing, namely, whether new load information is stored/updated in the final storage area of the ring buffer 51 set in Step S41. Then, when it is determined that the process does not reach the update stop timing, the controller 25 proceeds to Step S43, and stores/updates load information at this time in the ring buffer 51 in accordance with the order of storage areas. Then, the controller 25 proceeds to the above-described Step S5, performing corresponding processing and temporarily ending the process. When it is determined that the process reaches the update stop timing in Step S42, the controller 25 directly proceeds to Step S5, performing corresponding processing and temporarily ending the process.

That is, the update of the ring buffer 51 is repeated in every arithmetic period Ta until new load information is stored/updated in the final storage area of the ring buffer 51 set in Step S41 in the case where a failure detection exists by processes of Steps S2, S41 to S43. Accordingly, N-pieces of load information in failure detection is stored in the ring buffer 51.

As described above, the following effects can be obtained according to the embodiment in addition to the effects in the first embodiment.

(1) In the embodiment, the storage/update of load information in every arithmetic period Ta with respect to the ring buffer 51 can be performed by just rewriting the oldest load information in the stored load information and by setting the storage area in which load information to be the oldest in this stage to the top storage area, which can further lighten the processing load of the controller 25.

(2) In the embodiment, the CPU 31 can acquire load information in failure detection before the failure detection bit is switched from "0" to "1" as the reproduced waveform data Di by setting update stop timing of the ring buffer 51.

Third Embodiment

Hereinafter, a third embodiment of the load detection device will be explained. The third embodiment has a changed configuration in which a detection signal of a collision detection sensor is used at the time of determining a failure in the first or the second embodiment, therefore, detailed explanation for the same components will be omitted.

As shown in FIG. 3, a collision detection sensor 43 detecting existence of vehicle collision is connected to the CPU 31 of the ECU 30 through the communication interface 34, to which a detection signal of the collision detection sensor 43 is inputted. The collision detection sensor 43 is formed of a satellite sensor, for example, installed in a front part of a vehicle, outputting a detection signal indicating the state of existence of vehicle collision. Then, the CPU 31 utilizes a detection signal of the collision detection sensor 43 at the time of determining the failure.

Figure 10:
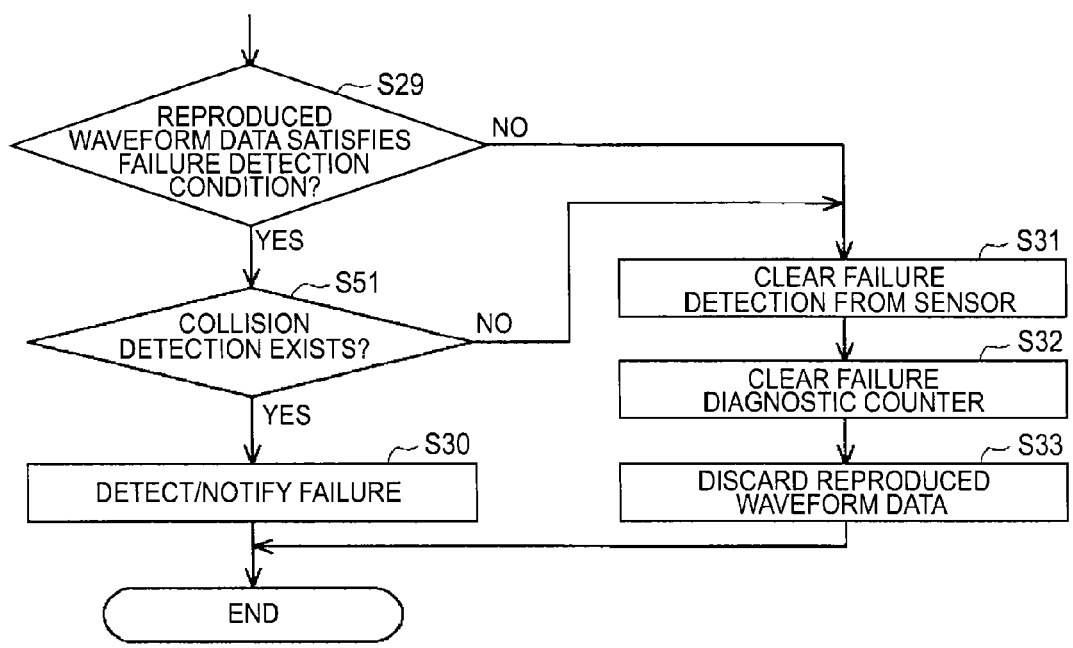
FIG. 10 is a flowchart showing a method of determining a failure by the ECU concerning a load detection device according to a third embodiment.

Next, a method of determining failure by the CPU 31 of the ECU 30 will be explained based on a flow chart shown in FIG. 10. As the processes are the same as those of FIG. 7 until reaching Step S29, processes after that will be explained. As shown in the drawing, when it is determined that the reproduced waveform data Di (i=1 to N) satisfies the failure detection condition in Step S29 (YES in Step S29), the CPU 31 proceeds to Step S51 and determines existence of collision detection based on the detection signal of the collision detection sensor 43.

Here, when it is determined that collision detection does not exist, the CPU 31 proceeds to Step S31 and performs processing in the same manner as in the above case where the failure detection condition is not satisfied (NO in Step S29). That is, the CPU 31 determines that failure of the load sensor 14 does not exist and cancels the determination of failure when it is determined that collision detection does not exist (No in Step S51) (determination cancel unit).

On the other hand, when it is determined that a collision detection exists in Step S51, the CPU 31 proceeds to Step S30, performing processing of the above-described detection/notification of the failure and temporarily ending the process.

As described above, the following effects can be obtained in addition to the effects of the above first or the second embodiment.

(1) In the embodiment, the CPU 31 cancels determination of existence of failure in Step S29 when the detection signal of the collision detection sensor 43 indicates the state where vehicle collision does not exist. Accordingly, the reliability in detection/notification of failure in Step S30 can be further improved.

The above embodiments may be altered as follows.

In the third embodiment, the collision detection sensor 43 may be connected to the air bag ECU 41. In this case, the ECU 30 may receive a detection signal of the collision detection sensor 43 (or a signal including collision detection information to which given processing is performed based on the detection signal) through the air bag ECU 41.

In the above respective embodiments, the setting of the predetermined time Td is an example, and for example, may be extended to a length corresponding to multiples of the time. The present predetermined time Td is set to the time which can almost contain the transition of load information which varies due to the impact at the time of vehicle collision, therefore, if repetition of the similar transition of load information is recognized in the extended predetermined time (Td), it can be confirmed that the repetition is caused by human factors such as tapping of the seat SE by the occupant.

In the above respective embodiments, transmission/reception of load information in failure detection between the signal processing device 20 and the ECU 30 which are stored in the buffer 27 or the ring buffer 51 may be automatically performed when the failure detection bit is "1" as well as may be performed in a manner in which the signal processing device 20 responds to a request signal from the ECU 30 which receives the failure detection bit of "1".

In the above respective embodiments, the predetermined time Td during which load information in failure detection is stored in the buffer 27 or the ring buffer 51 is arbitrary. The number of load information in failure detection stored in the buffer 27 or the ring buffer 51 is arbitrary. Furthermore, an update period of load information in failure detection with respect to the buffer 27 or the ring buffer 51 may be an integral multiple of the arithmetic period Ta. That is, update of load information in failure detection with respect to the buffer 27 or the ring buffer 51 may be performed in every other arithmetic period Ta or every plural arithmetic periods Ta. In short, it is preferable that the CPU 31 can determine existence of failure suitably based on the reproduced load information in failure detection (reproduced waveform data Di).

In the above respective embodiments, a physical quantity of the reproduced waveform data Di may be a voltage value correlating with a load value (corresponding to the load detection voltage V2).

In the above respective embodiments, the acquisition of failure information by the controller 25 may be performed based on magnitude relation between load information obtained by performing A/D conversion of the load detection voltage V2 and the threshold for detecting the failure.

In the above respective embodiments, the CPU 31 may determine, for example, whether the occupant is an adult or a child based on load information.

In the above respective embodiments, the number of load sensors 14 is not limited to "4" but other numbers may be adopted as long as they are natural numbers.

In the above respective embodiments, the controller 25 formed of a MCU (microcomputer) may be adopted.

In the above respective embodiments, the configuration of the sensor body 10 is an example, and other configurations may be adopted as long as the load applied to the seat SE can be detected.

In the above respective embodiments, the notification (Step S30) at the time of detecting a failure may be performed by, for example, a speaker or sound of a buzzer.

A load detection device according to an aspect of this disclosure includes a load sensor, and a control device connected to the load sensor so as to perform bidirectional communication, in which the load sensor includes a first controller acquiring load information in every predetermined arithmetic period based on a load detection signal corresponding to a load applied to a seat as well as acquiring failure information based on magnitude relation between the load detection signal and a threshold signal corresponding to a threshold for detecting a failure, and a load information storage unit storing the load information in every arithmetic period in a predetermined time as load information in failure detection as the failure information is switched to a state where a failure exists, the control device includes a second controller receiving the load information and the failure information in every predetermined communication period which is longer than the arithmetic period, and the second controller includes a waveform reproduction unit sequentially receiving the load information in failure detection in every arithmetic period in the predetermined time stored in the load information storage unit in every communication period when the failure information indicates the state where a failure exists and reproducing the load information in failure detection, and a failure determination unit determining presence of a failure based on the reproduced load information in failure detection.

According to this configuration, the second controller receives and reproduces the load information in failure detection in every arithmetic period in the predetermined time by the waveform reproduction unit as well as determines the presence of a failure based on the reproduced load information in failure detection by the failure determination unit. In this case, the second controller can utilize transition of the load information in failure detection such as lapsed time until load information is switched from one of increase and reduction to the other of them, or lapsed time until these variations converge in addition to threshold determination in accordance with the threshold determination in the first controller in the determination of existence of the failure by the failure determination unit. Accordingly, accuracy in determining presence of a failure in the failure determination unit can be further improved. In the case where the second controller makes suitable notification to promote repair when the failure determination unit determines that a failure exists, the reliability in notification can be further improved. On the other hand, the second controller can just receive the load information in failure detection in every arithmetic period in the predetermined time stored in the load information storage unit sequentially in every communication period by the waveform reproduction unit, therefore, it is not necessary to increase a communication load.

In the load detection device, a detection signal of a collision detection sensor which detects presence of a vehicle collision may be inputted to the second controller, and it is preferable that the second controller includes a determination cancel unit which cancels determination of the presence of failure by the failure determination unit when the detection signal of the collision detection sensor indicates a state where a vehicle collision does not exist in the case where the failure determination unit determines that a failure exists.

According to this configuration, when the detection signal of the collision detection sensor indicates the state where the vehicle collision does not exist, the determination that the failure exists by the failure determination unit is cancelled by the determination cancel unit, thereby further improving reliability of the notification.

In the load detection device, it is preferable that the load information storage unit is a ring buffer in which storage and update of the load information are stopped in an end period of the predetermined time.

According to this configuration, storage and update of the load information in every arithmetic period with respect to the ring buffer can be realized by rewriting the oldest load information in the stored load information and setting a storage area in which load information to be the oldest at this stage is stored to the top storage area, thereby lightening a processing load.

In the load detection device, it is preferable that the load information in failure detection stored in the load information storage unit is cleared when it is determined that a failure does not exist by the failure determination unit.

The aspect of this disclosure has an advantage that reliability in notification to promote repair can be further improved without increasing the communication load.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A load detection device comprising:
a load sensor; and
a control device connected to the load sensor so as to perform bidirectional communication,
wherein the load sensor includes
a first controller acquiring load information in every predetermined arithmetic period based on a load detection signal corresponding to a load applied to a seat and acquiring failure information based on magnitude relation between the load detection signal and a threshold signal corresponding to a threshold for detecting a failure, and
a load information storage unit storing the load information in every arithmetic period in a predetermined time as load information in failure detection as the failure information is switched to a state where a failure exists,
the control device includes a second controller receiving the load information and the failure information in every predetermined communication period which is longer than the arithmetic period, and
the second controller includes
a waveform reproduction unit sequentially receiving the load information in failure detection in every arithmetic period in the predetermined time stored in the load information storage unit in every communication period when the failure information indicates the state where a failure exists and reproducing the load information in failure detection, and
a failure determination unit determining presence of a failure based on the reproduced load information in failure detection.

2. The load detection device according to claim 1,
wherein a detection signal of a collision detection sensor which detects presence of a vehicle collision is inputted to the second controller, and
the second controller includes a determination cancel unit which cancels determination of the presence of failure by the failure determination unit when the detection signal of the collision detection sensor indicates a state where a vehicle collision does not exist in the case where the failure determination unit determines that a failure exists.

3. The load detection device according to claim 1,
wherein the load information storage unit is a ring buffer in which storage and update of the load information are stopped in an end period of the predetermined time.

4. The load detection device according to claim 1
wherein the load information in failure detection stored in the load information storage unit is cleared when it is determined that a failure does not exist by the failure determination unit.

* * * * *